E. MANLEY.
Traction-Wheel for Street-Cars.

No. 210,206.  Patented Nov. 26, 1878.

Witnesses:
A. P. Grant
W. F. Kircher

Inventor:
Edwin Manley,
by John A. Wiedersheim
ATTORNEY.

UNITED STATES PATENT OFFICE.

EDWIN MANLEY, OF PHILADELPHIA, PENNSYLVANIA.

IMPROVEMENT IN TRACTION-WHEELS FOR STREET-CARS.

Specification forming part of Letters Patent No. 210,206, dated November 26, 1878; application filed April 22, 1878.

*To all whom it may concern:*

Be it known that I, EDWIN MANLEY, of the city and county of Philadelphia, and State of Pennsylvania, have invented a new and useful Improvement in Propelling Vehicles, which improvement is fully set forth in the following specification and accompanying drawings, in which—

Figure 1:
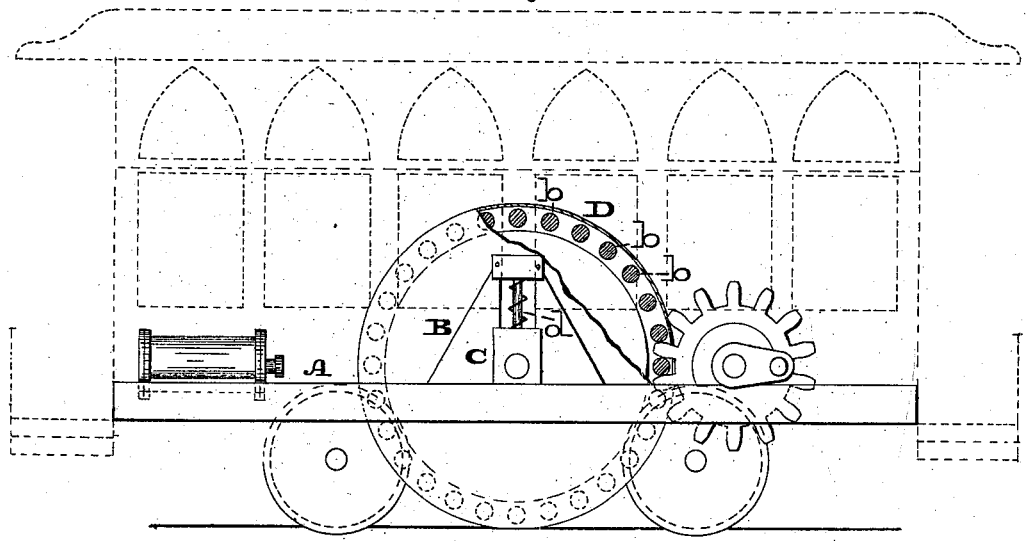
Figure 2:
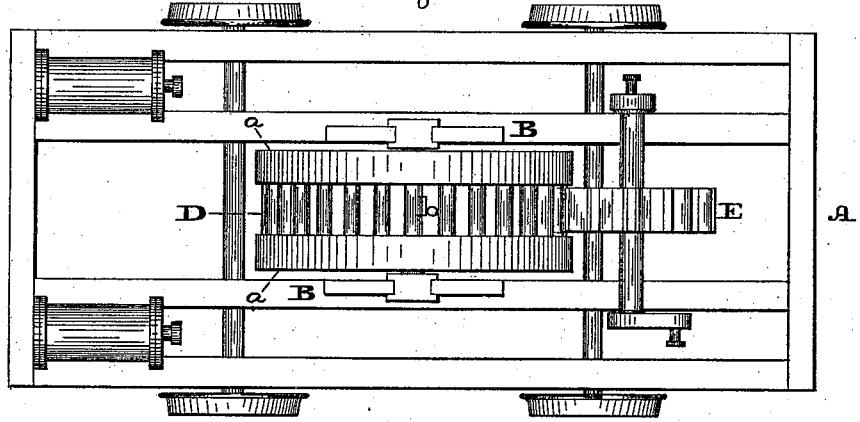

Figure 1 is a side elevation, partly sectional, of the device embodying my invention. Fig. 2 is a top or plan view thereof.

Similar letters of reference indicate corresponding parts in the several figures.

My invention consists of the combination, with the truck, frame or body of a car or other vehicle, of a mechanically-operated propelling-wheel, which will take proper hold of the ground or roadway, and be prevented from clogging. For this purpose I construct the wheel with two treads and separated rounds, which latter constitute teeth for the engagement of the power-wheel.

Referring to the drawings, A represents the truck, frame or body of a vehicle, at or about the center of the sides of which there rise standards B, which are vertically slotted for the reception of boxes C of the journals of a propelling-wheel, D, consisting of a wheel which is separated at its circumference, so as to form two rims or treads, a a. Between the rims there are secured transversely-extending rounds b b, with which engage a toothed wheel, E, whose bearings are on the truck A, and power is communicated to said wheel E from a steam-engine or other motor, whereby the wheel D is operated. The boxes C have rising and falling motions, and are forced downward by means of springs d, fitted to stems or guides connected to the upper portions or top cross-pieces of the standards B, said springs thus permitting the wheel D to yield to any inequalities of the ground or roadway.

It will be seen that the traction of the wheel D, when rotated, propels the vehicle. The wheel holds firmly to its work, and when it rises there is sufficient play between the teeth of the wheel E and the rounds b to prevent binding thereof. The two treads insure engagement of the wheel with the ground or roadway, especially if irregular. Owing to the open spaces between the rounds, dirt, stones, &c., taken up will fall therefrom, and thus the wheel is prevented from clogging.

The treads will be properly tired, for purposes of strengthening and increase of traction, and the vehicle will be mounted on wheels in any proper manner.

I am aware that traction-wheels have been applied to vehicles, and that they are variously constructed.

Having thus described my invention, what I claim as new, and desire to secure by Letters Patent, is—

1. The traction-wheel D, formed with two treads, a a, and separated tooth-rounds b b, substantially as and for the purpose set forth.

2. The wheeled truck A, with slotted standards B, springs d, and mechanically-operated wheel E, in combination with the rising and falling traction-wheel D, formed with two treads, a a, and separated tooth-rounds b b, all constructed, arranged, and operating as herein set forth.

EDWIN MANLEY.

Witnesses:
JOHN A. WIEDERSHEIM,
H. E. GARSED.